United States Patent
Williams

(10) Patent No.: US 7,484,069 B2
(45) Date of Patent: Jan. 27, 2009

(54) WATCHPOINTING UNALIGNED DATA ACCESSES

(75) Inventor: Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 237 days.

(21) Appl. No.: 11/528,698

(22) Filed: Sep. 28, 2006

(65) Prior Publication Data

US 2008/0082781 A1    Apr. 3, 2008

(51) Int. Cl.
*G06F 12/00* (2006.01)
(52) U.S. Cl. .................. 711/201; 711/154; 711/157; 700/26; 712/40; 712/217; 712/227; 714/34; 714/51; 717/127
(58) Field of Classification Search ............ 711/201, 711/154, 157; 700/26; 712/40, 217, 227; 714/34, 51; 717/127
See application file for complete search history.

(56) References Cited

U.S. PATENT DOCUMENTS

| | | | | |
|---|---|---|---|---|
| 5,598,553 A * | 1/1997 | Richter et al. | ................ | 703/23 |
| 6,615,370 B1 * | 9/2003 | Edwards et al. | ................ | 714/45 |
| 6,634,020 B1 * | 10/2003 | Bates et al. | ................ | 717/131 |
| 6,732,307 B1 * | 5/2004 | Edwards | ................ | 714/724 |
| 6,820,195 B1 * | 11/2004 | Shepherd | ................ | 712/300 |
| 6,918,065 B1 * | 7/2005 | Edwards et al. | ................ | 714/45 |
| 7,047,520 B2 * | 5/2006 | Moore et al. | ................ | 717/129 |
| 7,254,699 B2 * | 8/2007 | Shepherd | ................ | 712/225 |
| 7,334,161 B2 * | 2/2008 | Williams et al. | ................ | 714/34 |
| 2005/0071583 A1 * | 3/2005 | Shepherd | ................ | 711/154 |

* cited by examiner

*Primary Examiner*—Stephen C Elmore
(74) *Attorney, Agent, or Firm*—Nixon & Vanderhye P.C.

(57) ABSTRACT

A data processing system incorporating watchpoint registers is provided. The memory accesses to be detected may be unaligned memory accesses. The watchpoint may operate in a normal mode and also in a guard mode. In the guard mode of operation a watchpoint comparator generates a match signal if the upper N bits of the memory address match the upper end bits of the watchpoint address and the length of the memory access L is such that the memory access extends to include a memory address having a different upper N bits but located at a predetermined address offset P from the watchpoint address W.

21 Claims, 9 Drawing Sheets

| COMP[1:0] | CSIZE | BL[3:0] |
|---|---|---|
| 00 | 1 | 0001 |
| 00 | 1 | 0010 |
| 00 | 1 | 0100 |
| 00 | 1 | 1000 |
| 00 | 2 | 0011 |
| 10 | 2 | 1100 |
| 00 | ≥ 4 | 1111 |
| X1 | ≥ 2 | #UNP |
| 1X | ≥ 2 | #UNP |

FIG. 2C

| HADDR[1:0] | HSIZE | BL[3:0] |
|---|---|---|
| 00 | 1 | 0001 |
| 01 | 1 | 0010 |
| 10 | 1 | 0100 |
| 11 | X | 1000 |
| 00 | 2 | 0011 |
| 01 | 2 | 0110 |
| 10 | 2 or 4 | 1100 |
| 00 | 4 | 1111 |
| 01 | 4 | 1110 |

FIG. 2B

| P4 | HADDR[1:0] | HSIZE | BL[3:0] |
|---|---|---|---|
| 1 | 00 | X | 0000 |
| 1 | XX | 1 | 0000 |
| 1 | 01 or 10 | 2 | 0000 |
| 1 | 01 | 4 | 0001 |
| 1 | 10 | 4 | 0011 |
| 1 | 11 | 2 | 0001 |
| 1 | 11 | 4 | 0111 |

| HADDR[1:0] | HSIZE | COMP[1:0] | CSIZE | BLMATCH |
|---|---|---|---|---|
| 00 | X | 00 | X | 1 |
| 00 | 1 | 01 | 1 | 0 |
| 00 | 1 or 2 | 10 or 11 | X | 0 |
| 00 | 2 or 4 | 01 | 1 | 1 |
| 00 | 4 | 10 or 11 | X | 1 |
| 01 | X | 01 | 1 | 1 |
| 01 | 1 | 00 | 1 | 0 |
| 01 | X | 00 | 2 or 4 | 1 |
| 01 | 1 | 10 | 1 or 2 | 0 |
| 01 | 2 or 4 | 10 | 1 or 2 | 1 |
| 10 | X | 10 | 1 or 2 | 1 |
| 10 | X | 00 | 1 or 2 | 0 |
| 10 | X | 01 | 1 | 1 |
| 10 | 1 | 11 | 1 | 0 |
| 10 | 2 or 4 | 11 | 1 | 1 |
| 11 | X | 11 | 1 | 1 |
| 11 | X | 00 | 4 | 1 |
| 11 | X | 10 | 2 | 1 |
| 11 | X | 00 | 1 or 2 | 0 |
| 11 | X | 10 | 1 | 0 |
| X | X | 01[a] or 11[a] | 2[a] or 4[a] | #UNP |
| X | X | 10[a] | 4[a] | #UNP |

Note a: These combinations of COMP[1:0] and CSIZE are not allowed (COMP must be aligned to CSIZE).

FIG. 9

| P4 | HADDR[1:0] | HSIZE | COMP[1:0] | CSIZE | BLMATCH |
|---|---|---|---|---|---|
| 1 | 00 | X | X | 1 | 0 |
| 1 | 01 | 4 | 00 | 1 | 1 |
| 1 | 01 | 1 or 2 | X | 1 | 0 |
| 1 | 10 | 4 | 00 or 01 | 1 | 1 |
| 1 | 10 | 4 | 10 | 1 | 0 |
| 1 | 10 | 1 or 2 | X | 1 | 0 |
| 1 | 11 | 1 | X | 1 | 0 |
| 1 | 11 | 2 | 00 | 1 | 1 |
| 1 | 11 | 2 | 01 or 10 | 1 | 0 |
| 1 | 11 | 4 | 00 or 01 or 10 | 1 | 1 |
| 1 | X | X | 11[a] | X | #UNP |
| 1 | X | X | X | 2[a] or 4[a] | #UNP |

Note a: These settings of COMP[1:0] and CSIZE are not allowed with P4=1.

FIG. 10

WATCHPOINTING UNALIGNED DATA ACCESSES

BACKGROUND OF THE INVENTION

1. Field of the Invention

This invention relates to the field of data processing systems. More particularly, this invention relates to watchpointing within data processing systems whereby memory accesses to particular memory addresses being watched are detected.

2. Description of the Prior Art

It is known in the field of data processing systems to provide watchpointing mechanisms whereby a user can configure the system to detect when one or more particular memory addresses are subject to a memory access. This type of mechanism is particularly useful when debugging software or hardware and when analysing the operation of a system. One known mechanism for performing such watchpointing is illustrated in FIGS. 1 and 2 of the accompanying drawings.

FIG. 1 shows a sequence of memory addresses 2 with the memory address for each byte being expressed with the upper 30 bits within square brackets and the two least significant bits separately enumerated. As is common within data processing systems for a variety of reasons, the memory accesses provided in the illustration of FIG. 1 are aligned memory accesses; that is the address of the first byte accessed is a multiple of the number of the bytes. The individual bytes of memory are arranged into four byte words, each byte being eight bits in length and hence each word being 32 bits in length. The boundaries 4, 6 between words are shown by double lines in FIG. 1. Since the largest memory access permitted is a four byte word access, and all accesses are aligned, it follows that memory accesses cannot span a boundary between words, i.e. memory accesses are aligned with the word boundaries.

In the example illustrated in FIG. 1, the four bytes marked with a "*" are to be read. This is achieved by performing a first memory access which includes the byte 8 followed by a second memory access which includes the bytes 10,12,14. It will be appreciated that when fewer than the full four bytes within a word are actually required, the other bytes may be returned in the aligned access, but simply ignored. It is also possible that only the required bytes maybe returned. In either case, the memory access will have an associated length corresponding to the number of bytes within that access that are actually required.

FIG. 1 illustrates that byte 12 is subject to watchpointing. The memory address of this byte is [A]:0:1. As previously explained [A], represents the upper 30 bits of the address, with the remaining bits of the address being separately enumerated. The lower two bits can be regarded as specifying a particular byte lane within the aligned memory word spanning between the word boundaries 4, 6.

FIG. 2A illustrates a watchpoint comparator which maybe used to detect memory accesses to byte 12 of FIG. 1. A request for a memory access will be generated, typically by hardware such as a processor core, a DSP unit, a peripheral device or some other bus master, and issued to the memory system. The memory access specifies a memory address HADDR, which is the start address of the memory access, together with the number of bytes HSIZE for that memory access. In the system illustrated in FIG. 2A, HSIZE may take the values 1, 2 or 4. HSIZE is typically encoded in few bits, for example as $\log_2(\text{HSIZE})$; that is a 2-bit binary value can be used with "00" encoding HSIZE=1 ($2^0$), "01" encoding HSIZE=2 ($2^1$) and "10" encoding HSIZE=4 ($2^2$). In the case of aligned memory accesses, HADDR must be aligned to HSIZE, that is HADDR is a multiple of HSIZE and as such the access will not span a word boundary 4, 6. However, for unaligned accesses HADDR is not aligned to HSIZE and as such may span a word boundary.

The upper 30 bits HADDR[31:2] of the memory access address are stored within a register 16. These are compared with corresponding bits stored as a watchpoint address COMP[31:2] within a register 18. An XNOR gate 20 indicates if the contents of the register 16 and the contents of the register 18 match. The byte lane(s) of one or more bytes of data being accessed is compared with the byte lane of the watchpoint within the byte lane portion 22 of the watchpoint comparator 15. In particular, the two least significant bits of the memory access address HADDR[1:0] and the access length HSIZE are used by a mask generator 24 to generate a 4-bit mask value in which the bit values for the non-accessed byte lanes are zero and the bit value for the accessed byte lanes are one. For aligned accesses, as these do not span a word boundary, this mask value represents all the bytes of memory accessed by the memory access. FIG. 2B shows how the mask generator 24 generates the byte lane mask, HBL[3:0]. HBL[0] corresponds to the first byte of the word, HBL[1] to the second byte, and so on. FIG. 2B includes entries for generating byte lane masks for unaligned accesses. These are not relevant in a system that only supports aligned accesses.

A corresponding byte lane mask is generated for the watchpoint address by mask generator 26 using the least significant two bits of the watchpoint address COMP[1:0] 27 together with a programmed watchpoint size value CSIZE 28. In the system illustrated in FIG. 2A, CSIZE may take the values 1, 2, or 4. CSIZE is typically encoded within register 28 in a small number of bits, for example as $\log_2(\text{CSIZE})$. The full watchpoint address, COMP[31:0] (that is, the compound of COMP[31:2] and COMP[1:0]) is required to be aligned to the value of CSIZE. Watchpointed locations are required to be aligned. FIG. 2C shows how the mask generator 26 generates the byte lane mask, CBL[3:0]. The unaligned cases in FIG. 2C show a byte lane generated of #UNP, meaning the output is not defined as this is not a permitted case. FIG. 2C also includes an entry for CSIZE>=4; this is not permitted in this embodiment but will be described in terms of other embodiments later.

If the outputs of the mask generators 24 and 26 have a common bit which is set to one in both generated masks, then the AND gates 30 and the OR gate 32 detect this and pass an output signal together with the output of the XNOR gate 22 to AND gate 34. The output from the AND gate 34 is a match signal which is asserted when the memory access specified by the memory access address HADDR[31:0] (that is, the compound of HADDR[31:2] and HADDR[1:0]) and HSIZE matches the watchpoint insofar as the top 30-bits of the address HADDR[31:2] match the top 30-bits of the watchpoint address COMP[31:2], and that at least one of the watchpointed bytes within the aligned word, as indicated by COMP[1:0] and CSIZE, is being accessed. The match signal output from the AND gate 34 can be used for a variety of different purposes, such as, for example, triggering entry into a debug mode, triggering an interrupt, triggering the generation of trace or profiling information or in some other way.

In other embodiments, the byte lane mask generated by mask generator 26 in respect of the watchpointed location would instead be explicitly defined in the watchpoint register as CBL[3:0]. Only COMP[31:2] therefore needs to be defined in the watchpoint register and COMP[1:0] and CSIZE are not defined in the watchpoint register.

In other embodiments, CSIZE can be extended to support watchpointed locations larger than 4 bytes. In this case a CSIZE can take values ranging from 1 ($2^0$) bytes to $2^{31}$ bytes. CSIZE can advantageously be encoded as a 5-bit field which defines the number of bits of the address comparison to ignore, that is $\log_2(\text{CSIZE})$. The corresponding bits of COMP [31:0] must be programmed as zero. In such an embodiment, where CSIZE is greater than 4 (word), the function of XNOR comparator 20 in FIG. 2A is modified to not compare those low-order bits of HADDR specified by $\log_2(\text{CSIZE})$, and the function of mask generator 26 is modified such that it generates a mask with all bits set, as shown in FIG. 2C.

In other embodiments, CBL[3:0] and the extended CSIZE are both defined in the watchpoint register. In such an embodiment, the minimum value for CSIZE is 4 (word), indicating bits [1:0] of the address are not to be compared by XNOR comparator 20,—the CBL field defines smaller-than-word watchpoints. For CSIZE>=4, it is defined that CBL[3:0] must be programmed as all ones "1111"; for example, if CSIZE=8, indicating bits [2:0] are ignored, COMP[2] must be zero and CBL[3:0] must be all ones. It does not make sense to define sub-word matches (byte lanes) when an address mask of more than a word is defined.

This embodiment is more flexible than the previous embodiment because you can, for example, program CBL[3:0] as "0101", setting a watchpoint on 2 bytes within a word which do not make up an aligned halfword. This is not possible where CSIZE and COMP[1:0] are used to generate the byte lane mask.

FIG. 3 of the accompanying drawings illustrates a problem which arises when the approach of FIGS. 1 and 2 is extended to systems supporting unaligned memory accesses. Within such systems memory accesses can span word boundaries 36, 38. FIG. 3 illustrates six different 4 byte memory accesses starting from respective memory locations. Memory access 40 is entirely within the word boundaries 36, 38. Memory accesses 42, 44 and 46 all span the word boundary 38. Memory access 50 does not span the word boundary 38.

In FIG. 3, byte address A is subject to watchpointing. The system of FIG. 2 in which both the upper portion HADDR [31:2] and the byte lane must match in order to register a watchpoint hit produces false negative results in respect of the memory accesses 42, 44 and 46 of FIG. 3. In the case of these three false negatives 42, 44, 46, the upper portion of the memory address HADDR[31:2] differs from that of the address A and accordingly the XNOR gate 20 of FIG. 2 produces a low output and the match signal is not generated. In FIG. 3, it is only the memory access 50 which triggers the match signal since the upper portion of the address HADDR [31:2] and the byte lane both match. Memory access 48 matches in its upper portion, but not byte lane and is a "true" negative.

The consequences of the false negatives of FIG. 3 can be severe within a debugging or analysis system. For example, if a programmer is trying to determine which portion of the system is incorrectly writing to a particular memory address A then if the errant portion is making its inappropriate write by a memory access corresponding to one of the three false negatives, this will not be detected by the watchpoint comparator 15 programmed in respect of byte A.

FIG. 4 illustrates an example of a technique to address the problem of false negatives illustrated in respect of FIG. 3. In FIG. 4 both the original byte A is subject to watchpointing as well as the immediately preceding byte A-1, which serves as a guard watchpoint. In this example, the memory accesses 40, 42, 44 and 46 will all trigger match signals from the guard watchpoint on address A-1. The match signals in respect of the memory accesses 42, 44 and 46 are correct in that those memory accesses 42, 44 and 36 do extend into the next word and access byte A, but the memory access 40 is a false positive in that whilst it triggers the guard watchpoint by virtue of accessing address A-1, it does not in fact extend beyond the word boundary and access address A. Thus, whilst the approach of FIG. 4 does not suffer from the problem of false negatives, it introduces its own problem of a false positive.

Whilst it would be possible for whatever mechanism was triggered by the match signal to conduct further analysis and identify false positives, such processing can be significantly disadvantageous. For example, a system may arise where memory access 40 is very common and correct in normal operation, with the erroneous accesses to the address A being highly infrequent. In this circumstance there would be a high number of false positives for each genuine access of interest to address A. Not only would this slow down the proper identification of a potential bug, it could also distort the processing activity by the repeated interruption to deal with false positives in a manner which masked or changed the errant behaviour.

The present technique both recognises the above problem and provides a solution to that problem.

SUMMARY OF THE INVENTION

Viewed from one aspect of the present invention providing apparatus for processing data, said apparatus comprising:

a memory access request generator for generating a memory access starting from a memory address A and having a byte length of L;

a watchpoint comparator having a programmable watchpoint address W and responsive to said memory address A and said byte length L during a guard mode of operation to detect a guard mode match condition if both:
  (i) an upper N bits of said memory address A are equal to a corresponding upper N bits of said watchpoint address W; and
  (ii) said byte length L is such that said memory access extends to include a memory address having a different upper N bits and located at a predetermined address offset P from said watchpoint address W; and to generate a match signal if said guard mode match condition is detected.

The present technique preserves the ability to maintain the advantageously hardware efficient mechanism within the watchpoint comparator of comparing the upper bits of the memory address and the watchpoint address whilst properly taking account of whether a memory access triggering upon a match of the upper bits for a guard watchpoint does or does not extend into the neighbouring memory word to a point which accesses a memory address at a predetermined address offset from the guard watchpoint address. This enables gate count and speed efficient comparators to be retained whilst allowing both guard watchpoint and normal watchpoints to be set up and controlled so that both false negatives and false positives are avoided. The memory access request generator could be a programmable processor responsive to program instructions, a DMA unit, a DSP unit or any other processing unit which generates memory access requests.

Whilst the present technique could be used for general memory accesses, it is particularly useful for unaligned memory accesses since these can span word boundaries and so suffer from the false negatives problem of FIG. 3.

In many systems the byte length of a transfer has a maximum or fixed value and within such systems the predetermined address offset is set to match this maximum value.

The watchpoint comparators which are used in a guard mode as described above can also be used in a normal mode to detect watchpoints in the normal way as illustrated in relation to FIGS. 1 and 2A, 2B and 2C. Such watchpoint comparators provide in combination both the new guard mode behaviour of the present technique and the standard normal mode of the operation.

It will be appreciated that the programmable watchpoint address can be programmed in a variety of different ways, including, for example, simply a binary address value. However, in preferred embodiments the watchpoint is programmed as an upper N bits and a size value for the address which specifies the size of the watched location, allowing one watchpoint to watch more than one contiguous locations.

It will be appreciated that in typical embodiments the system will include a plurality of watchpoint comparators since it can be desirable to instrument multiple memory locations. Within such systems providing a plurality of watchpoint comparators, it is advantageous that substantially half should offer both the normal mode and the guard mode of operation since the guard mode will normally be used in association with another watchpoint comparator operating in the normal mode and accordingly the extra provision of the guard mode is not justified in more than half of the total number of watchpoint comparators.

Viewed from another aspect the present invention provides a method of detecting a memory access starting from a memory address A and having a byte length of L to a memory address within an apparatus for processing data using unaligned memory accesses, said method comprising the steps of:

programming a normal mode watchpoint comparator with a normal mode watchpoint address $W_{normal}$ to operate in a normal mode to detect a normal mode match condition if:

(i) an upper N bits of said memory address A are equal to a corresponding upper N bits of said normal mode watchpoint address $W_{normal}$; and (ii) said memory access includes at least one predetermined byte that is subject to watchpointing; and programming a second watchpoint comparator with a guard mode watchpoint address $W_{guard}$ to operate in a guard mode to detect a guard mode match condition if both:

(i) an upper N bits of said memory address A are equal to a corresponding upper N bits of said guard mode watchpoint address $W_{guard}$; and (ii) said byte length L is such that said memory access extends to include a memory address having a different upper N bits and located at a predetermined address offset P from said guard mode watchpoint address $W_{guard}$; and generating a match signal if either of said normal mode match condition or said guard mode match condition is detected.

Viewed from a further aspect of the invention provides a computer program medium bearing a computer program, said computer program controlling a diagnostic apparatus and being responsive to a user input specifying a watchpoint address to configure an apparatus for processing data to perform a method of detecting an unaligned memory access starting from a memory address A and having a byte length of L to a memory address within said apparatus for processing data, said method comprising the steps of:

programming a normal mode watchpoint comparator with a normal mode watchpoint address $W_{normal}$ to operate in a normal mode to detect a normal mode match condition if:

(i) an upper N bits of said memory address A are equal to a corresponding upper N bits of said normal mode watchpoint address $W_{normal}$; and (ii) said memory access includes at least one predetermined byte lane that is subject to watchpointing; and programming a second watchpoint comparator with a guard mode watchpoint address $W_{guard}$ to operate in a guard mode to detect a guard mode match condition if both:

(i) an upper N bits of said memory address A are equal to a corresponding upper N bits of said guard mode watchpoint address $W_{guard}$; and (ii) said byte length L is such that said memory access extends to include a memory address having a different upper N bits and located at a predetermined address offset P from said guard mode watchpoint address $W_{guard}$; and generating a match signal if either of said normal mode match condition or said guard mode match condition is detected.

Viewed from a further aspect of the present invention provides apparatus for processing data, said apparatus comprising:

means for generating a memory access request in response to a program instruction to generate a memory access starting from a memory address A and having a byte length of L;

watchpoint comparator means having a programmable watchpoint address W and responsive to said memory address A and said byte length L during a guard mode of operation to detect a guard mode match condition if both:

(i) an upper N bits of said memory address A are equal to a corresponding upper N bits of said watchpoint address W; and (ii) said byte length L is such that said memory access extends to include a memory address having a different upper N bits and located at a predetermined address offset P from said watchpoint address W; and to generate a match signal if said guard mode match condition is detected.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 2A, 2B and 2C schematically illustrates a watchpoint comparator;

FIGS. 9 and 10 are tables illustrating the operation of a byte lane matcher of FIG. 8;

DESCRIPTION OF THE PREFERRED EMBODIMENTS

Figures 5, 6:
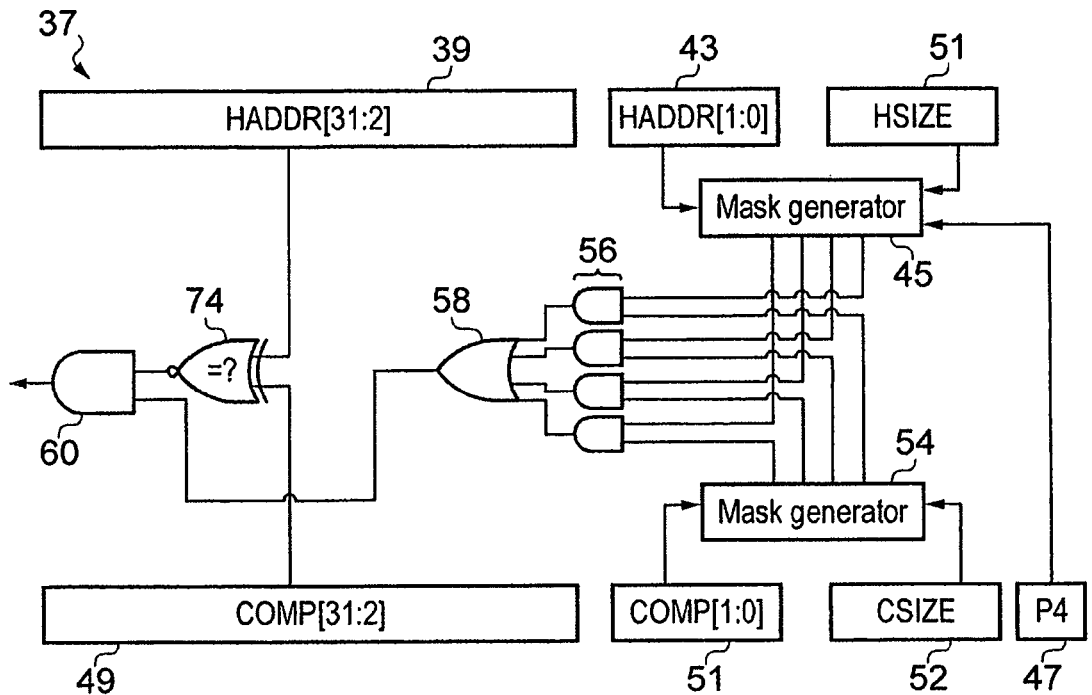
FIG. 5 illustrates a watchpoint comparator supporting both a normal mode and a guard mode operation.
FIG. 6 is a table illustrating the generation of a byte lane mask in the system of FIG. 5.

FIG. 5 illustrates a watchpoint comparator 37 supporting both normal mode operation and guard mode operation in accordance with one example of the present techniques. Register 39 stores an upper N bits (30 bits) of a memory access address A. The memory access has a byte length L, which is stored within a register 41 as a value HSIZE. The two least significant bits of the memory address A are stored within register 43 as HADDR[1:0]. These portions of the embodiment of FIG. 5 are the same as the corresponding parts of the embodiment of FIG. 2A. However, the mask generator 45 in FIG. 5 has an input from a register 47 which stores a value P4 indicating that the watchpoint comparator 37 should be operated in a guard mode rather than a normal mode of operation. When the value P4 is set, then this modifies the behaviour of the mask generator 45 compared with that previously described in relation to FIGS. 2A and 2B. When P4 is set, the mask generator 45 produces byte lane mask values HBL[3:0] in accordance with the table illustrated in FIG. 6. More particularly, the byte lane mask values HBL[3:0] which are generated in the guard mode by the mask generator have bit values set to "1" for those byte lanes within which should a memory access address A lie and have a byte length as specified by HSIZE, then the memory access will extend to include a position four bytes above the programmed guard watchpoint.

It will be appreciated that while this example embodiment and associated figures consider a system with: 32-bit addressing, and a 32-bit (word) sized bus, the techniques scale to other systems; e.g. HADDR[31:0] and COMP[31:0] scale to any number of address bits and HADDR[1:0]/COMP[1:0] and HSIZE/CSIZE can scale to more than 4-bytes per access (the generation of HBL/CBL[ ] bits scales accordingly, e.g. to HBL/CBL[7:0] for a 64-bit bus).

An alternative implementation is to scale the HBL[ ] mask up irrespective of the size of the bus, so there are more HBL[ ] bits than bytes-per-access, for example, the comparator uses HADDR[2:0] and HSIZE to generate an 8-bit byte lane mask, HBL[7:0] and as a result guard watchpoints aren't needed when COMP[2]=1 for the watchpointed location, as for such locations there are no false positives, whether HADDR[2]=0 or HADDR[2]=1. HBL[3:0] is compared against CBL[3:0] as usual, and HBL[7:4] is also compared against CBL[3:0]. Guard watchpoints are only checked for those guard watchpoints where COMP[2]=0 and those accesses where HADDR[2]=1 accesses, i.e. where there's a possibility that the access wraps from HADDR[2]=1 to HADDR[2]=0, which would generate a false negative on a normal watchpoint.

Extending HBL[ ] in this way can be done repeatedly (for example, using HADDR[3:0] to generate a 16-bit byte lane mask HBL[15:0]), but the need for P4 doesn't disappear unless HADDR[31:0] is used to generate a byte lane mask HBL[$2^{32}$-1:0], which is not a feasible implementation.

The location of the guard watchpoint being compared against is stored within registers 49, 51 and 52 in the normal way i.e. specifying the upper N bits in register 49, the least significant bits within register 51 and size value within register 52. The size value is typically encoded using a small number of bits, for example as $log_2(size)$. However, for a guard watchpoint the size value need only ever indicate a single byte. A mask generator 54 operates in the same way as in the FIG. 2 embodiment and produces a masked value with one bit set to "1" corresponding to the byte lane within which the guard watchpoint is located. A match between the byte lane mask generated by the mask generator 54 and the byte lane mask generated by the mask generator 54 in accordance with FIG. 6 will result in the AND gates 56 and the OR gate 58 producing a hit. If the upper N bit portions of the memory access address A and the guard watchpoint address stored within the register 48 also match then a match signal is produced by the AND gate 60 for this guard mode operation of the watchpoint comparator 37.

Figure 1:
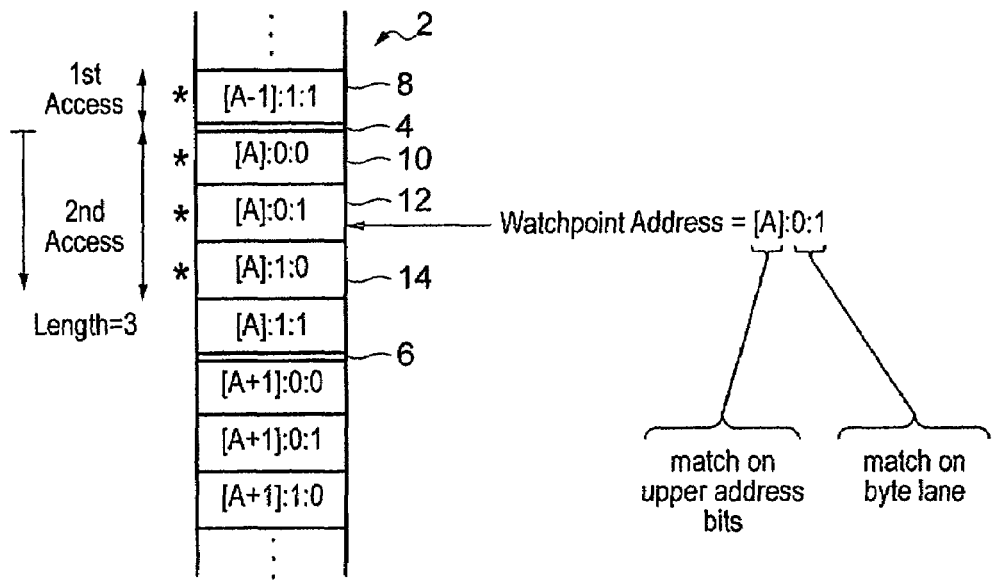
FIG. 1 schematically illustrates watchpointing a memory address within a system supporting aligned memory accesses.
Figure 3:
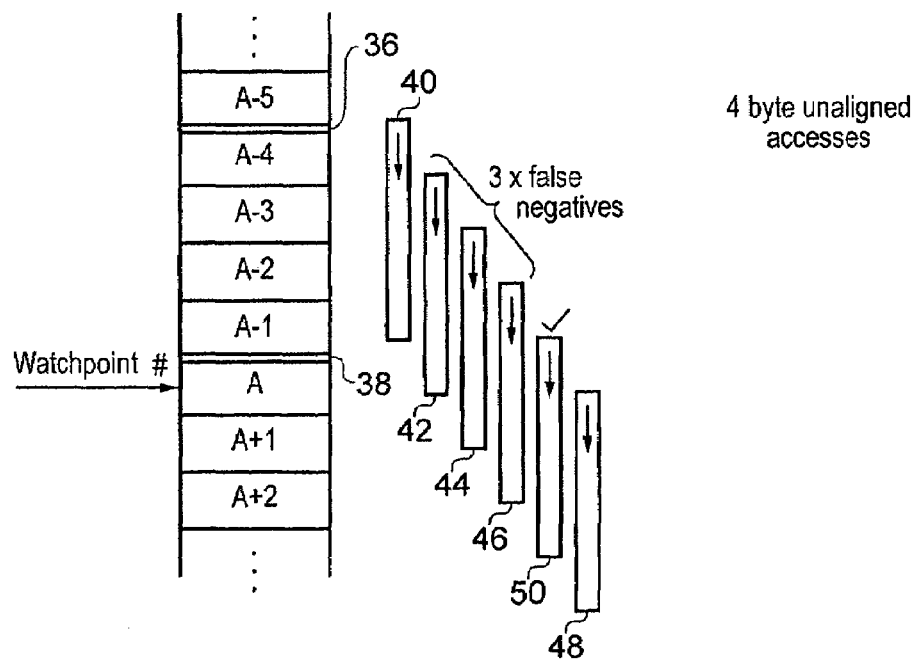
FIG. 3 schematically illustrates false negatives which may arise within a system supporting an unaligned memory accesses.
Figure 4:
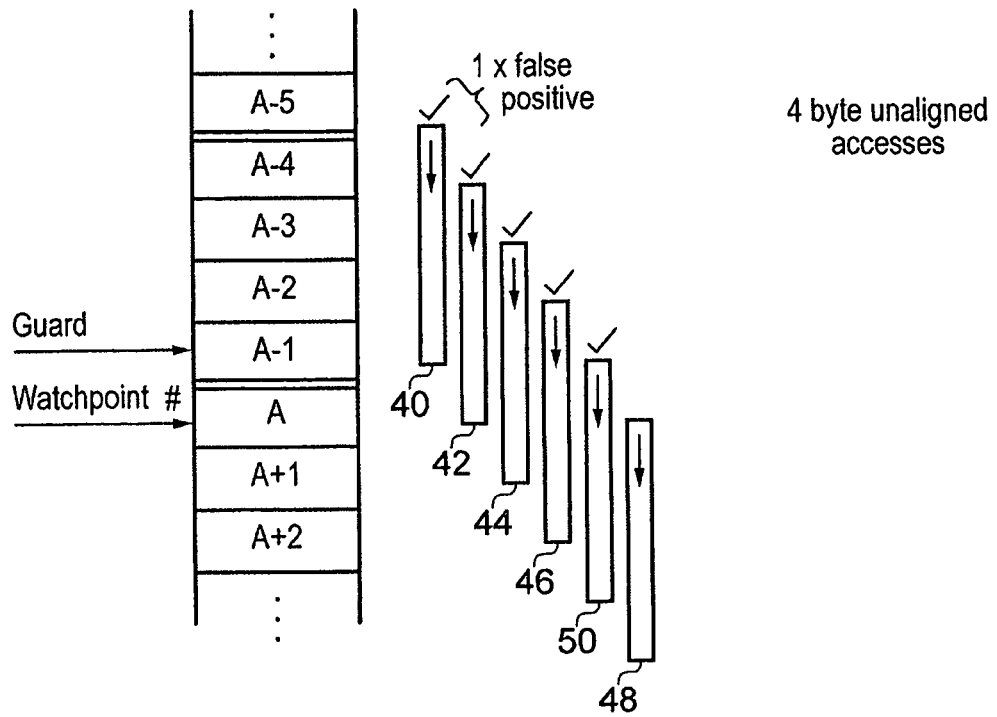
FIG. 4 schematically illustrates false positives which may arise within a system supporting an unaligned memory accesses.
Figure 2A:
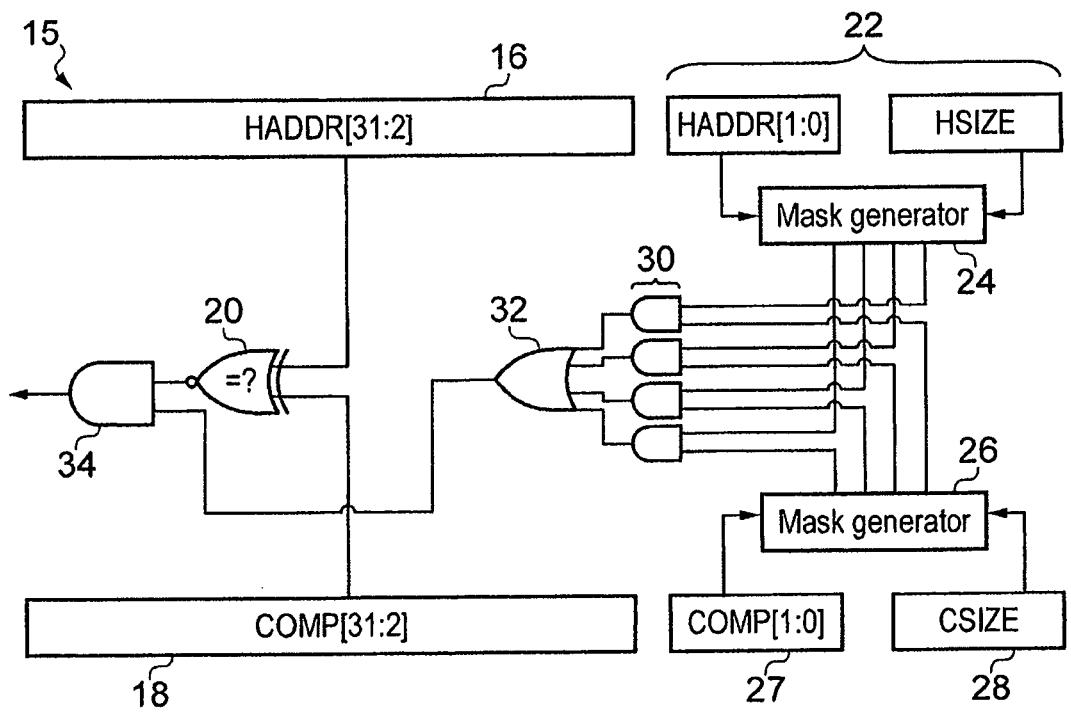
Figure 7:
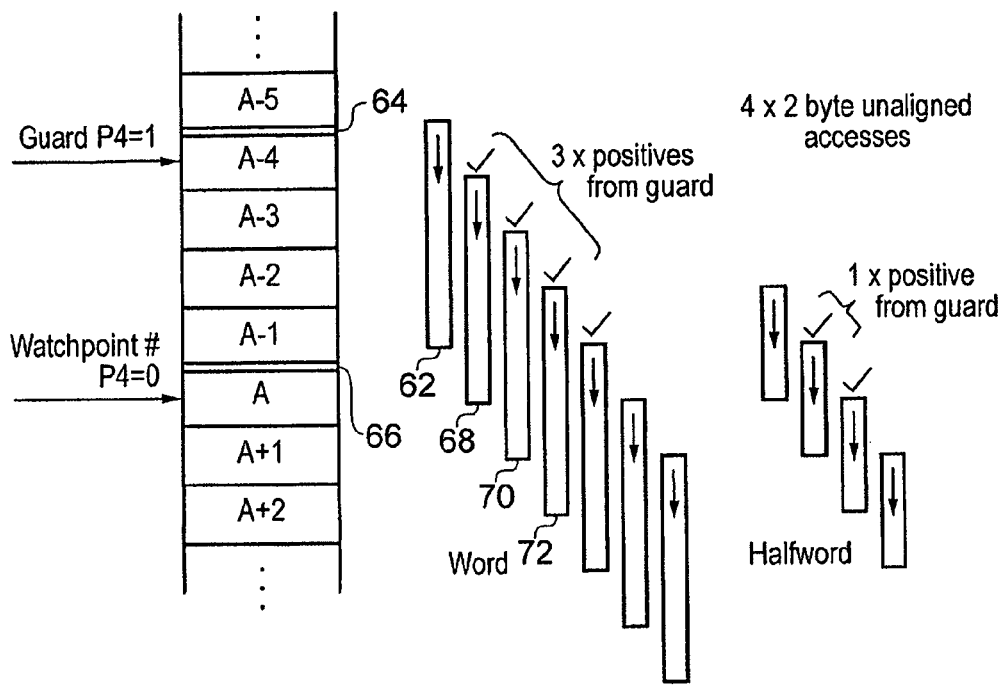
FIG. 7 schematically illustrates the operation of the watchpoint comparator of FIG. 5 in association with unaligned memory accesses.

FIG. 7 illustrates the operation of the watchpoint comparator 37. The watchpoint, which is subject to normal mode watchpointing by a separate comparator such as illustrated in FIG. 2A, is at address A. The guard mode watchpoint is positioned at address A-4. This corresponds to the maximum byte length of a memory access, in this example i.e. four bytes. The memory access 62 which in the corresponding example of FIG. 4 gave a false positive does not give rise to a false positive when using the present technique. This is a consequence of the different operation of the watchpoint comparator 37 in the new guard mode in combination with the positioning of the guard mode watchpoint which is different from that of FIG. 4. The guard mode watchpoint is positioned at address A-4 where it shares the upper N bits of its address value with the other bytes within the word extending between boundaries 64 and 66. Accordingly, the memory accesses 62, 68, 70 and 72 will all match in a comparison of their upper N bits of address and accordingly produce a hit signal from the XNOR gate 74 of FIG. 5. However, the mask generator 44 of FIG. 5 generates different byte lane masks for the different memory accesses 62, 68, 70, 72. All of these memory accesses 62, 68, 70, 72 have a length L equal to four. However, the lower two address bits HADDR[1:0] differ as illustrated in FIG. 6. With the memory access 62 having a value "00" stored within register 43. With this value of the lower two address bits, it will be seen that irrespective of the length value the byte lane mask has all zeroes "0000" and accordingly the AND gates 56 and the OR gate 58 of FIG. 5 will not register a hit at the byte lane level. Thus, the false positive which might have arisen through the match of the upper N bit portions stored in registers 39 and 49 is avoided.

Figure 8:
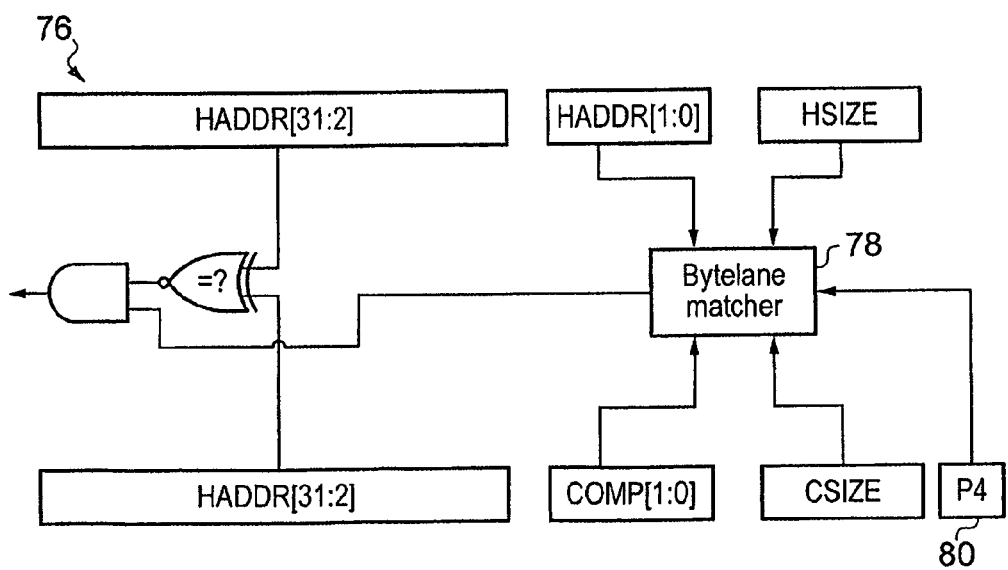
FIG. 8 is an alternative example embodiment of a watchpoint comparator supporting guard mode operation.

FIG. 8 schematically illustrates an alternative form of watchpoint comparator 76 capable of both guard mode and normal mode operation. In this alternative embodiment, the action of the mask generators 45 and 54 together with that of the AND gates 56 and the OR gate 58 are all combined within a byte lane matcher circuit 78. This is a lookup table which may provide a shallower logic path, and accordingly faster operation, compared to the example of FIG. 5. The lookups performed by the byte lane matcher 78 when operating in the normal mode (i.e. P4="0") are illustrated in FIG. 9. When the byte lane matcher 78 is also within a watchpoint comparator 76 which supports guard mode operation, the guard mode specifying register 80 is provided and when this is set to store a value "1", then the outputs of the byte lane matcher 78 will be as illustrated in FIG. 10. The entry #UNP indicates "don't care" in that this is an illegal setting and so the output can have any value.

Figure 11:
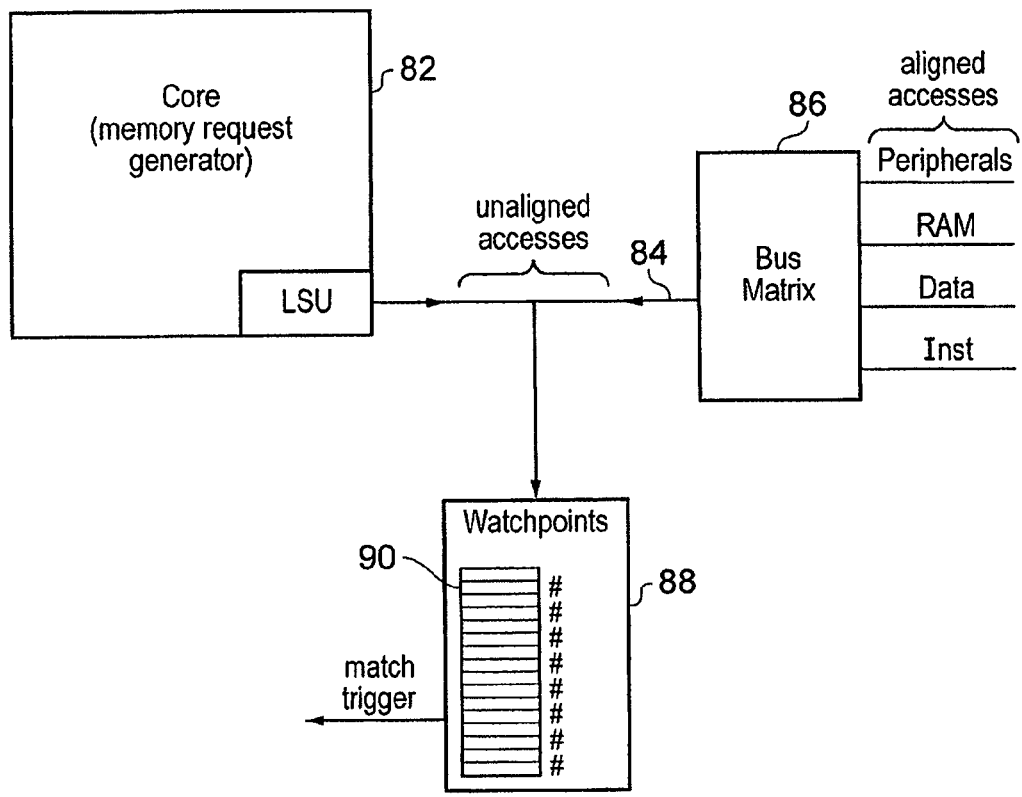
FIG. 11 schematically illustrates a data processing system incorporating watchpoint comparators.

FIG. 11 schematically illustrates an example of a data processing system utilising watchpoints. A data processing core 82, which serves as a source of memory requests (i.e. a memory request generator) is provided and communicates using an unaligned accesses bus 84 with a bus matrix 86. It will be appreciated that many other different forms of memory request generator may serve to generate unaligned memory accesses on the bus 84, such as DSPs, peripherals, DMA units, and other devices. A watchpoint unit 88 snoops the bus 84 and contains a plurality of watchpoint comparators 90 programmed with respective watchpoints. Those watchpoint comparators marked with "#" (half) support both guard mode operation and normal mode operation as discussed above. The remaining watchpoint comparators support only normal mode operation. If any of the watchpoint comparators 90 match, then a match trigger signal is generated. This is used to initiate some other action, such as entry into a debug state, running of a particular interrupt routine or the like.

Figure 12:
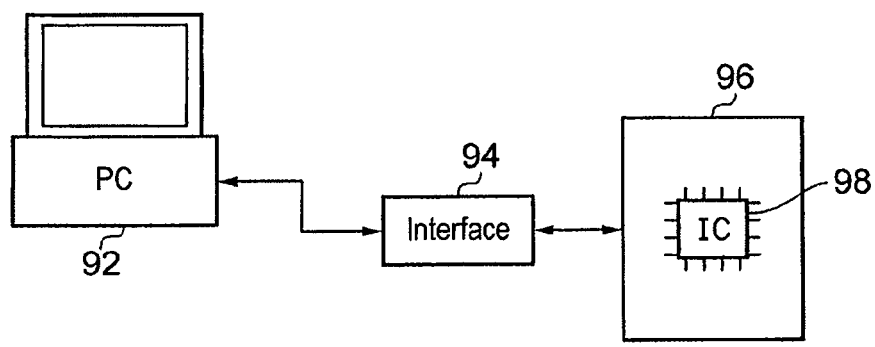
FIG. 12 illustrates a computer controlled diagnostic apparatus for controlling watchpoint comparators in accordance with the present technique.

FIG. 12 schematically illustrates a diagnostic apparatus for utilising watchpoints in accordance with the present techniques. The diagnostic apparatus comprises general purpose computer, such as a PC 92, connected via an interface board 94 to a printed circuit board 96 which is under investigation. The printed circuit board 96 incorporates an integrated circuit 98 which includes the watchpoint registers of interest. A computer program executing on the PC 92 serves to program into the watchpoint comparators 37, 76, 90 within the integrated circuit 98, via the interface board 94, the various address COMP[31:2], COMP[1:0] and CSIZE values to serve as either watchpoint or guard watchpoint positions. In addition, if a particular watchpoint comparator 37, 76 is to be used in a guard mode, then the register 47, 80 storing the P4 bit value indicating guard mode operation is set by the computer software executing on the PC. Thus, when seeking to set up a watchpoint for a memory address in a system supporting unaligned memory accesses of a maximum byte length of four, then a watchpoint is set up on a memory address concerned together with a guard watchpoint four byte positions earlier using a watchpoint comparator 37, 76 in the guard mode as previous described. Thus, both memory accesses in the word position of the actual watchpoint and memory accesses originating in the preceding word position and which overlap the watchpoint can be detected.

Figure 13:
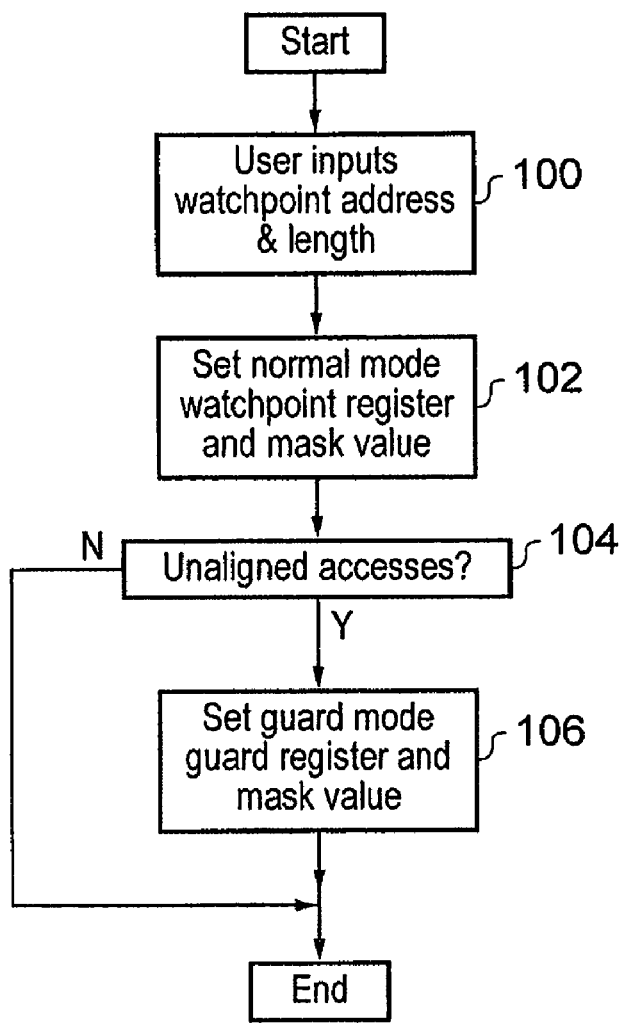
FIG. 13 is a flow diagram illustrating the configuration of watchpoint comparators for both a normal mode watchpoint register and a guard mode watchpoint register.

FIG. 13 schematically illustrates the operation of the computer program executed on the PC 92 of FIG. 12. At step 100 a user inputs a watchpoint address and a length of bytes following that watchpoint to the detected as watchpoint hits. At step 102, the normal mode operation of watchpoint register is set in response to the watchpoint address and length in the standard way. At step 104, it is determined whether or not the system is supporting unaligned accesses to the watchpoint address concerned. If such unaligned accesses are supported, then step 106 sets a guard mode watchpoint using an address four bytes in advance of the watchpoint address and with the guard mode bit P4 set.

Figure 14:
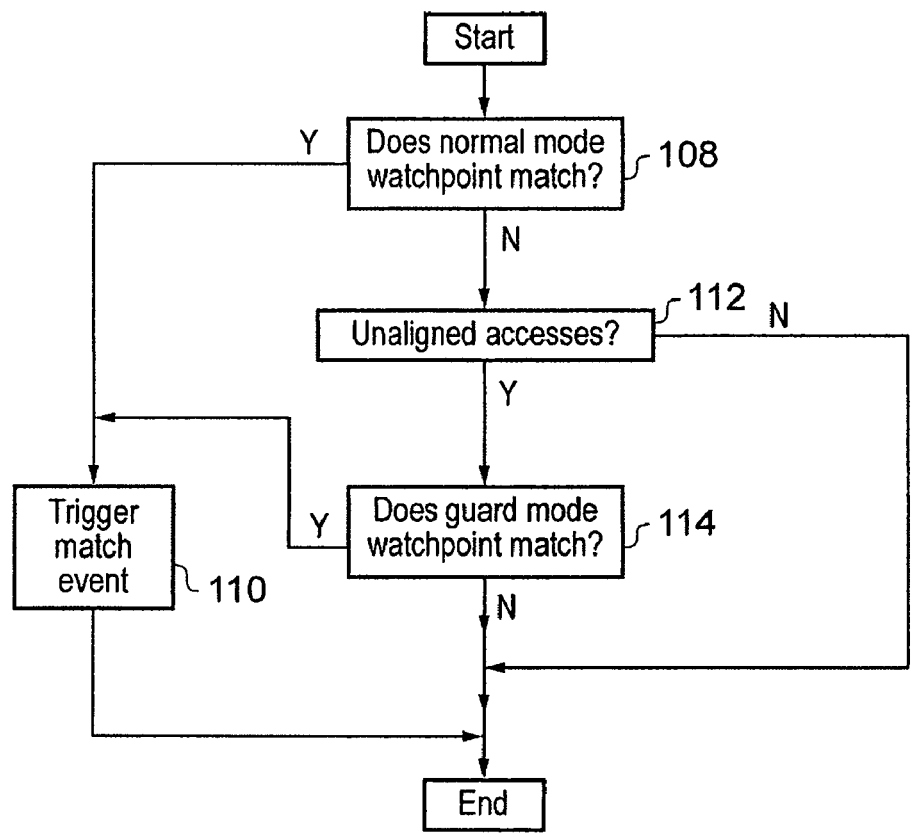
FIG. 14 illustrates match signal generation in a system having a normal mode watchpoint and a guard mode watchpoint as well as supporting unaligned accesses.

FIG. 14 schematically illustrates a flow diagram for the detection of watchpoints within a system supporting unaligned memory accesses. This flow diagram represents the operations sequentially. In practice the various comparisons are made in parallel and the results combined. At step 108, determination is made as to whether a normal mode watchpoint match has been detected. If such a detection is made, then a match event is triggered at step 110. If a normal mode watchpoint does not match, then step 112 determines whether or not unaligned accesses are supported. If such unaligned accesses are supported, then processing proceeds to step 114, where a determination is made as to whether any guard mode watchpoints have matched. If there are such guard mode watchpoint matches, then step 110 against triggers a match event.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
  a memory access request generator for generating a memory access starting from a memory address A and having a byte length of L;
  a watchpoint comparator having a programmable watchpoint address W and responsive to said memory address A and said byte length L during a guard mode of operation to detect a guard mode match condition if both:
    (i) an upper N bits of said memory address A are equal to a corresponding upper N bits of said watchpoint address W; and
    (ii) said byte length L is such that said memory access extends to include a memory address having a different upper N bits and located at a predetermined address offset P from said watchpoint address W; and
  to generate a match signal if said guard mode match condition is detected.

2. Apparatus as claimed in claim 1, wherein said memory access is an unaligned memory access.

3. Apparatus as claimed in claim 1, wherein said byte length has a maximum value $L_{max}$ and said predetermined address offset P has a value equal to $L_{max}$.

4. Apparatus as claimed in claim 1, wherein said apparatus is switchable between said guard mode and a normal mode and said watchpoint comparator is also operable in said normal mode to detect a normal mode match condition if:
  (i) an upper N bits of said memory address A are equal to a corresponding upper N bits of said watchpoint address W; and
  (ii) said memory access includes at least one predetermined byte lane to be subject to watchpointing; and
to generate a match signal if said normal mode match condition is detected.

5. Apparatus as claimed in claim 1, wherein said programmable watchpoint address is programmed as a watchpoint value for said upper N bits and one or both of:
  a byte lane mask value M having one bit position for each of a plurality of memory addresses sharing said watchpoint value as said upper N bits; and
  a watchpoint size value indicating a number of contiguous memory addresses sharing said watchpoint value as said upper N bits.

6. Apparatus as claimed in claim 5, wherein said byte length has a maximum value $L_{max}$, said predetermined address offset P has a value equal to $L_{max}$ and said byte lane mask has $L_{max}$ bit positions specifying respective ones of $L_{max}$ byte lanes.

7. Apparatus as claimed in claim 1, comprising a plurality watchpoint comparators.

8. Apparatus as claimed in claim 7, wherein substantially half of said plurality of watchpoint comparators have both a normal mode and a guard mode and a remainder of said plurality of watchpoint comparator have said normal mode, but not said guard mode.

9. A method of detecting a memory access starting from a memory address A and having a byte length of L to a memory address within an apparatus for processing data using unaligned memory accesses, said method comprising the steps of:
  programming a normal mode watchpoint comparator with a normal mode watchpoint address $W_{normal}$ to operate in a normal mode to detect a normal mode match condition if:

(i) an upper N bits of said memory address A are equal to a corresponding upper N bits of said normal mode watchpoint address $W_{normal}$; and (ii) said memory access includes at least one predetermined byte lane to be subject to watchpointing; and programming a second watchpoint comparator with a guard mode watchpoint address $W_{guard}$ to operate in a guard mode to detect a guard mode match condition if both:

(i) an upper N bits of said memory address A are equal to a corresponding upper N bits of said guard mode watchpoint address $W_{guard}$; and (ii) said byte length L is such that said memory access extends to include a memory address having a different upper N bits and located at a predetermined address offset P from said guard mode watchpoint address $W_{guard}$; and generating a match signal if either of said normal mode match condition or said guard mode match condition is detected.

10. A method as claimed in claim 9, wherein said byte length has a maximum value $L_{max}$ and said predetermined address offset P has a value equal to $L_{max}$.

11. A method as claimed in claim 9, wherein said programmable watchpoint address is programmed in respect of said normal mode as a watchpoint value for said upper N bits and one or both of:

a byte lane mask value M having one bit position for each of a plurality of memory addresses sharing said watchpoint value as said upper N bits; and a watchpoint size value indicating a number of contiguous memory addresses sharing said watchpoint value as said upper N bits.

12. A method as claimed in claim 11, wherein said byte length has a maximum value $L_{max}$ said predetermined address offset P has a value equal to $L_{max}$ and said byte lane mask has $L_{max}$ bit positions specifying respective ones of $L_{max}$ byte lanes.

13. A method as claimed in claim 9, wherein said apparatus for processing data comprising a plurality watchpoint comparators.

14. A method as claimed in claim 13, wherein substantially half of said plurality of watchpoint comparators have both a normal mode and a guard mode and a remainder of said plurality of watchpoint comparator have said normal mode, but not said guard mode.

15. A computer program medium bearing a computer program, said computer program controlling a diagnostic apparatus and being responsive to a user input specifying a watchpoint address to configure an apparatus for processing data to perform a method of detecting an unaligned memory access starting from a memory address A and having a byte length of L to a memory address within said apparatus for processing data, said method comprising the steps of:

programming a normal mode watchpoint comparator with a normal mode watchpoint address $W_{normal}$ to operate in a normal mode to detect a normal mode match condition if:

(i) an upper N bits of said memory address A are equal to a corresponding upper N bits of said normal mode watchpoint address $W_{normal}$; and (ii) said memory access includes at least one predetermined byte lane to be subject to watchpointing; and programming a second watchpoint comparator with a guard mode watchpoint address $W_{guard}$ to operate in a guard mode to detect a guard mode match condition if both:

(i) an upper N bits of said memory address A are equal to a corresponding upper N bits of said guard mode watchpoint address $W_{guard}$; and (ii) said byte length L is such that said memory access extends to include a memory address having a different upper N bits and located at a predetermined address offset P from said guard mode watchpoint address $W_{guard}$; and generating a match signal if either of said normal mode match condition or said guard mode match condition is detected.

16. A computer program medium as claimed in claim 15, wherein said byte length has a maximum value $L_{max}$ and said predetermined address offset P has a value equal to $L_{max}$.

17. A computer program medium as claimed in claim 15, wherein said programmable watchpoint address is programmed as a watchpoint value for said upper N bits and one or both of:

a byte lane mask value M having one bit position for each of a plurality of memory addresses sharing said watchpoint value as said upper N bits; and a watchpoint size value indicating a number of contiguous memory addresses sharing said watchpoint value as said upper N bits.

18. A computer program medium as claimed in claim 17, wherein said byte length has a maximum value $L_{max}$, said predetermined address offset P has a value equal to $L_{max}$ and said byte lane mask has $L_{max}$ bit positions specifying respective ones of $L_{max}$ byte lanes.

19. A computer program medium as claimed in claim 15, wherein said apparatus for processing data comprising a plurality watchpoint comparators.

20. A computer program medium as claimed in claim 19, wherein substantially half of said plurality of watchpoint comparators have both a normal mode and a guard mode and a remainder of said plurality of watchpoint comparator have said normal mode, but not said guard mode.

21. Apparatus for processing data, said apparatus comprising:

means for generating a memory access request in response to a program instruction to generate a memory access starting from a memory address A and having a byte length of L;

watchpoint comparator means having a programmable watchpoint address W and responsive to said memory address A and said byte length L during a guard mode of operation to detect a guard mode match condition if both:

(i) an upper N bits of said memory address A are equal to a corresponding upper N bits of said watchpoint address W; and (ii) said byte length L is such that said memory access extends to include a memory address having a different upper N bits and located at a predetermined address offset P from said watchpoint address W; and to generate a match signal if said guard mode match condition is detected.

* * * * *